(12) United States Patent
Mori et al.

(10) Patent No.: US 9,207,101 B2
(45) Date of Patent: Dec. 8, 2015

(54) OPTICAL DISPLACEMENT ENCODER

(71) Applicant: MITUTOYO CORPORATION, Kanagawa (JP)

(72) Inventors: Hiroatsu Mori, Kawasaki (JP); Tatsuya Narumi, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 148 days.

(21) Appl. No.: 14/206,439

(22) Filed: Mar. 12, 2014

(65) Prior Publication Data
US 2014/0291497 A1    Oct. 2, 2014

(30) Foreign Application Priority Data
Mar. 29, 2013 (JP) .................. 2013-072867

(51) Int. Cl.
*G01D 5/26* (2006.01)
*G01D 5/347* (2006.01)

(52) U.S. Cl.
CPC ............ *G01D 5/268* (2013.01); *G01D 5/34753* (2013.01)

(58) Field of Classification Search
CPC .......................... G01D 5/268; G01D 5/34753
USPC .................. 250/231.13–231.18, 239, 227.11
See application file for complete search history.

(56) References Cited

U.S. PATENT DOCUMENTS

| | | | | |
|---|---|---|---|---|
| 2004/0261283 | A1* | 12/2004 | Falkinger ........... | G01D 5/24442 33/707 |
| 2009/0071025 | A1* | 3/2009 | Affa ................... | G01D 5/34753 33/706 |
| 2010/0176283 | A1* | 7/2010 | Karasik ............. | G01D 5/34753 250/231.18 |

FOREIGN PATENT DOCUMENTS

JP     2011-033521 A    2/2011

OTHER PUBLICATIONS

U.S. Appl. No. 14/206,130 to Hiroatsu Mori et al., which was filed on Mar. 12, 2014.

* cited by examiner

*Primary Examiner* — Seung C Sohn
(74) *Attorney, Agent, or Firm* — Greenblum & Bernstein, P.L.C.

(57) ABSTRACT

An optical encoder includes a light source fiber holder holding a light source fiber and a collecting lens therein, and a nut. The light source fiber holder includes an end fitting together with a light source base. An outer circumferential surface of the end includes an inclined surface inclining such that a cross-sectional area increases as the surface approaches the light source fiber; and a projection capable of advancing into a groove of the light source base. The optical encoder includes a light source connector and the light source fiber holder.

4 Claims, 15 Drawing Sheets

OPTICAL DISPLACEMENT ENCODER

CROSS-REFERENCE TO RELATED APPLICATIONS

The present application claims priority under 35 U.S.C. §119 of Japanese Application No. 2013-072867, filed on Mar. 29, 2013, the disclosure of which is expressly incorporated by reference herein in its entirety.

BACKGROUND OF THE INVENTION

1. Field of the Invention

The present invention relates to an optical encoder.

2. Description of Related Art

Japanese Patent Laid-open Publication No. 2011-033521 discloses an optical encoder using an optical fiber. In the optical encoder using the optical fiber, electronic components are separated from a detection head by connecting the detection head and the electronic components via the optical fiber.

The optical fiber is used to transmit emitted light from a light source unit to the detection head. Accordingly, Japanese Patent Laid-open Publication No. 2011-033521 seeks to match positions of the light source unit-side optical fiber and the detection head-side optical fiber with a high degree of accuracy so as to enable transmission to the detection head without loss of the light emitted from the light source. Moreover, even when position matching can be performed favorably, the relative positions of the optical fibers may be offset due to external environmental changes (such as a change in temperature) and a stable optical connection may be impossible to maintain.

The present invention has been devised in consideration of the circumstances above, and provides an optical encoder capable of separably connecting to a light source and of maintaining a stable optical connection.

SUMMARY OF THE INVENTION

An optical encoder according to the present disclosure includes a detection head; a light source connector connected to the detection head via a light source fiber and a photoreceiver fiber; and a light source unit separably connected to the light source connector. The light source unit includes a light source; a light source holder holding the light source; and a light source base having a tubular shape holding the light source holder at a first end and holding a collimating lens therein, the light source base having a threaded portion on a second end and having a groove with a length along an axis direction on the second end. The light source connector includes a tubular light source fiber holder holding the light source fiber and a collecting lens therein; and a nut held so as to be rotatable in a manner centered around the light source fiber and so as to be displaceable along the light source fiber, and further including a threaded portion threading together with the threaded portion on the second end of the light source base while holding at least a portion of the light source fiber holder between the nut and the light source base. The light source fiber holder includes an end fitted together with the light source base. An outer circumferential surface of the end includes an inclined surface inclining such that a cross-sectional area increases as the surface approaches the light source fiber, and a projection capable of advancing into the groove of the light source base.

The above configuration enables separable connection to a light source and enables a stable optical connection to be maintained.

In addition, the light source fiber holder may further include a nut abutment in a direction oriented from the nut toward the light source fiber. In addition, the light source holder may also be held so as to be capable of displacement with respect to the collimating lens.

The present disclosure has been devised in consideration of the circumstances above, and provides an optical encoder capable of separably connecting to a light source and of maintaining a stable optical connection.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
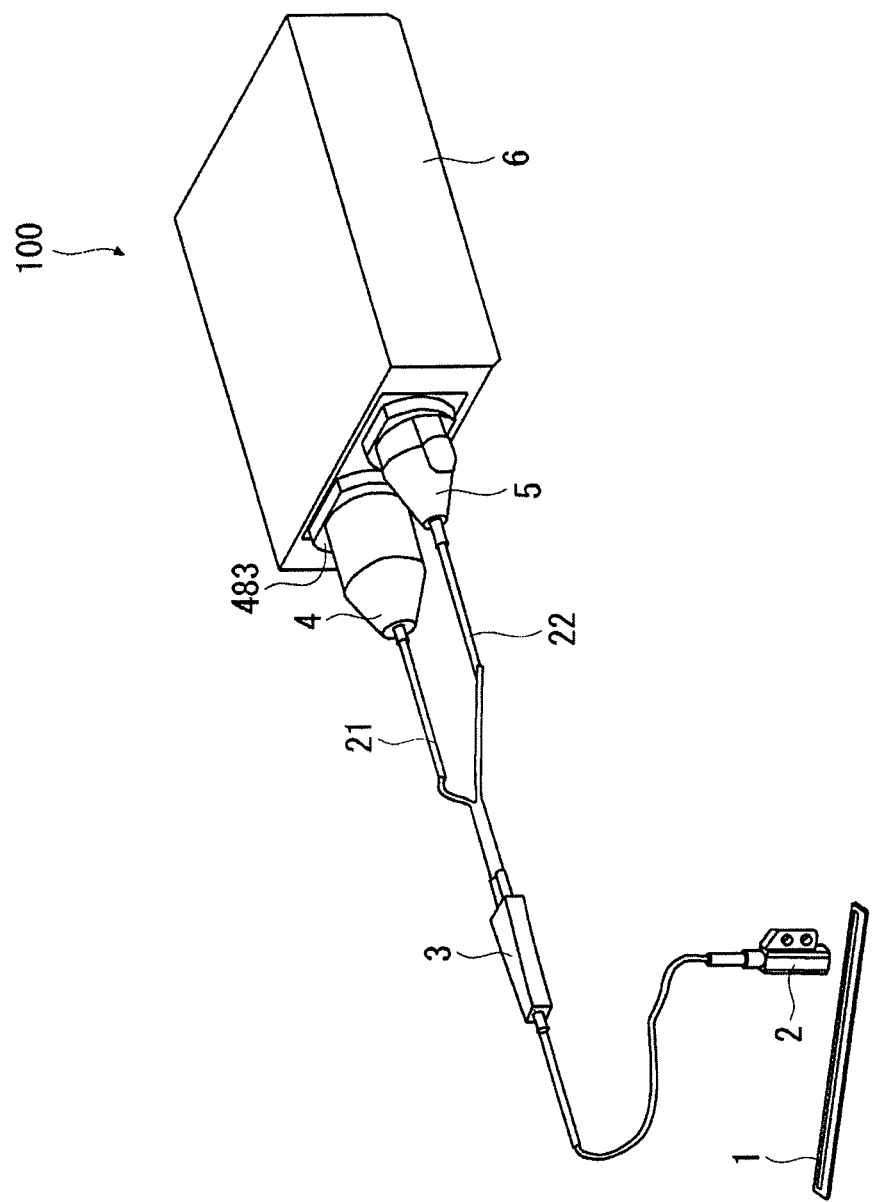
FIG. 1 is a perspective view of an optical encoder according to a first embodiment.
Figure 2A:
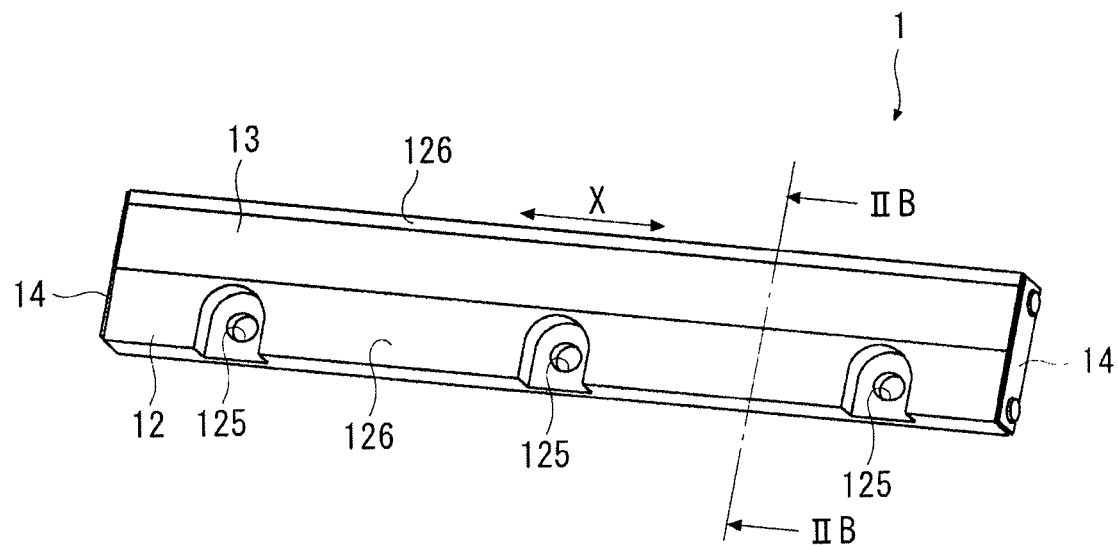
FIG. 2A is a perspective view of a scale unit of the optical encoder according to the first embodiment.
Figure 2B:
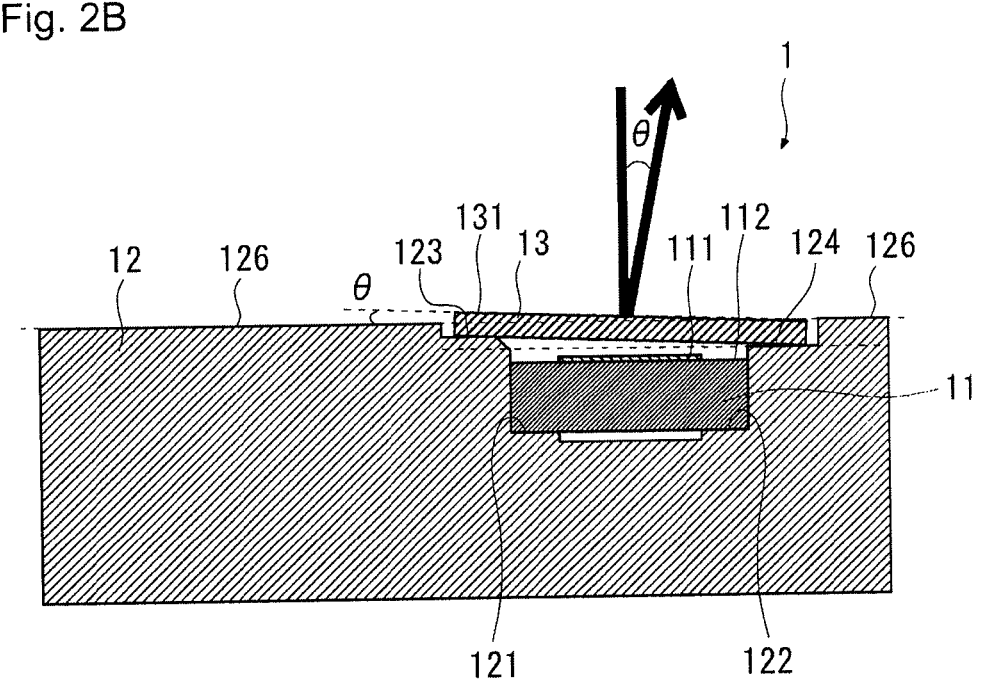
FIG. 2B is a cross-sectional view of the scale unit of the optical encoder according to the first embodiment.
Figure 3:
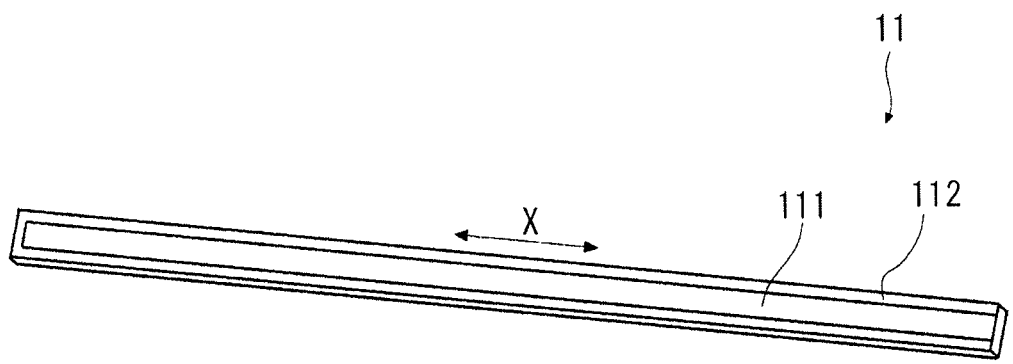
FIG. 3 is a perspective view of a main portion of the scale unit of the optical encoder according to the first embodiment.
Figure 4:
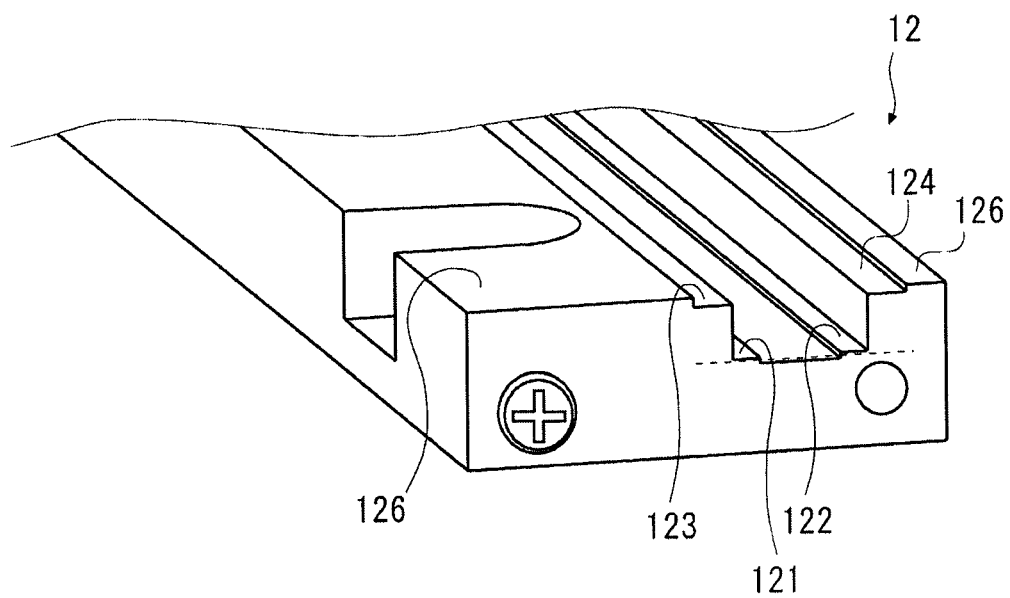
FIG. 4 is a perspective view of a main portion of the scale unit of the optical encoder according to the first embodiment.
Figure 5A:
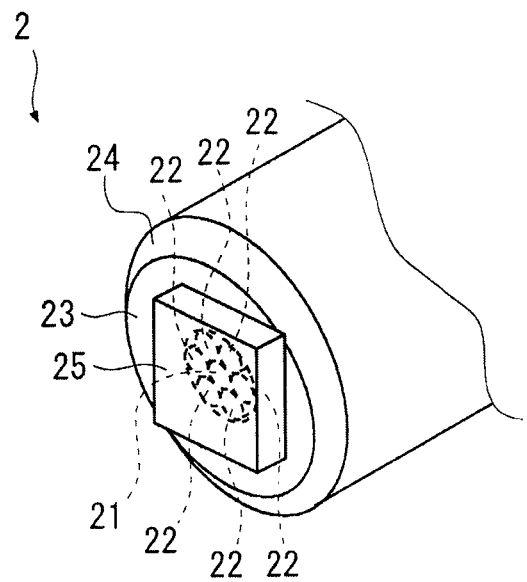
FIG. 5A is a perspective view of a main portion of a detection head of the optical encoder according to the first embodiment.
Figure 5B:
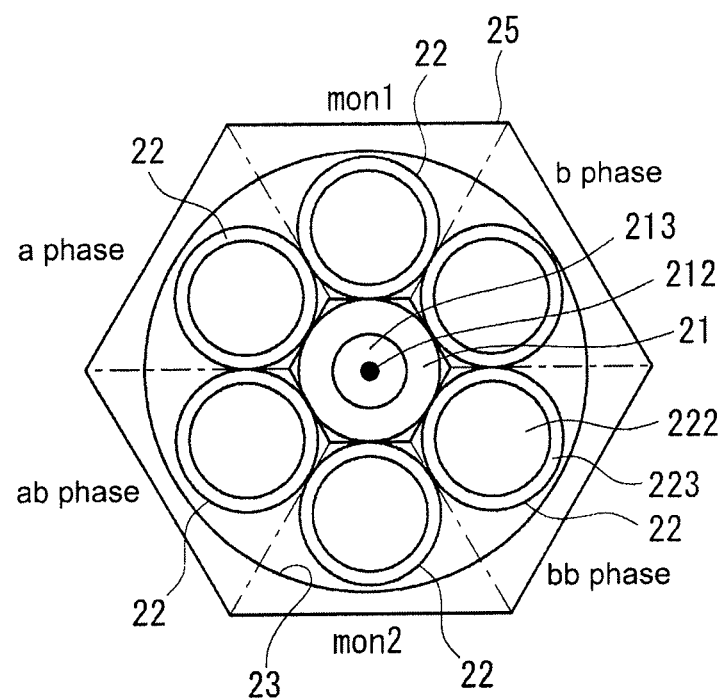
FIG. 5B is a front view of a main portion of the detection head of the optical encoder according to the first embodiment.
Figure 6:
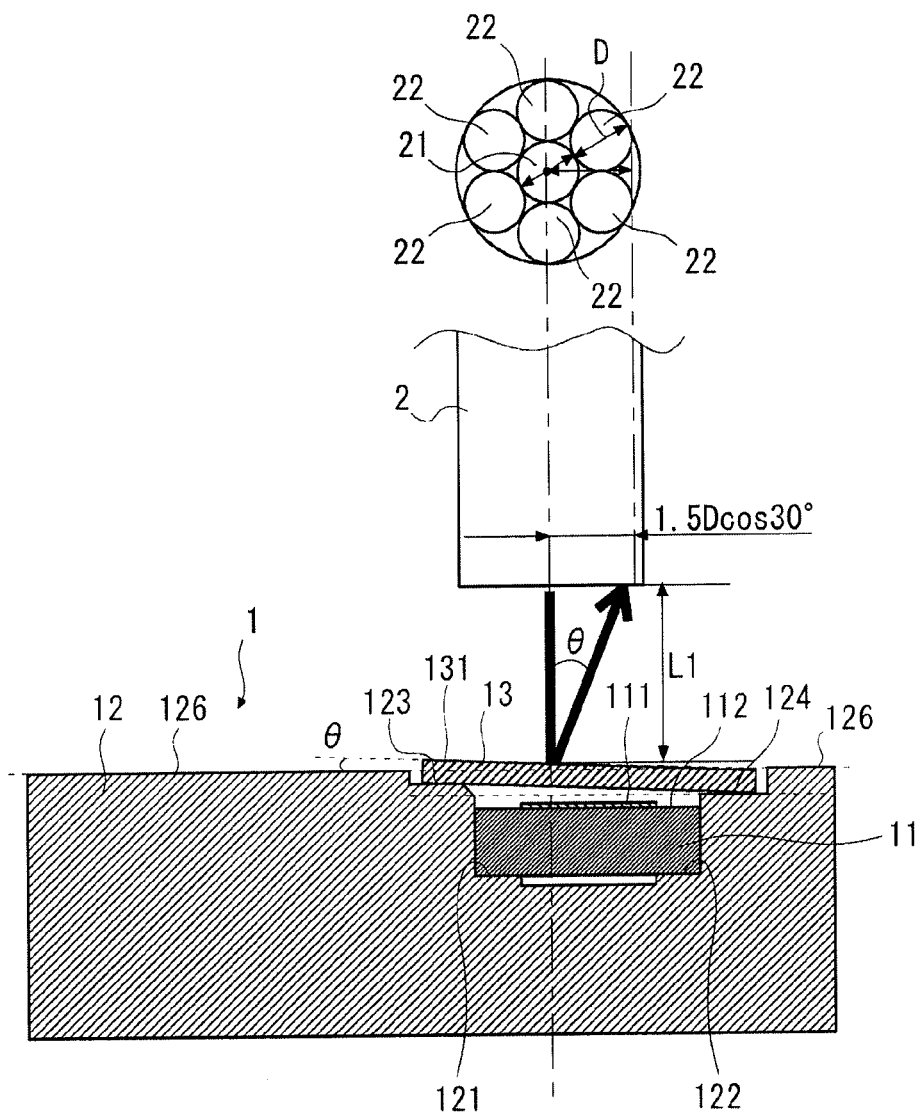
FIG. 6 is a side view of a main portion of the optical encoder according to the first embodiment.
Figure 7:
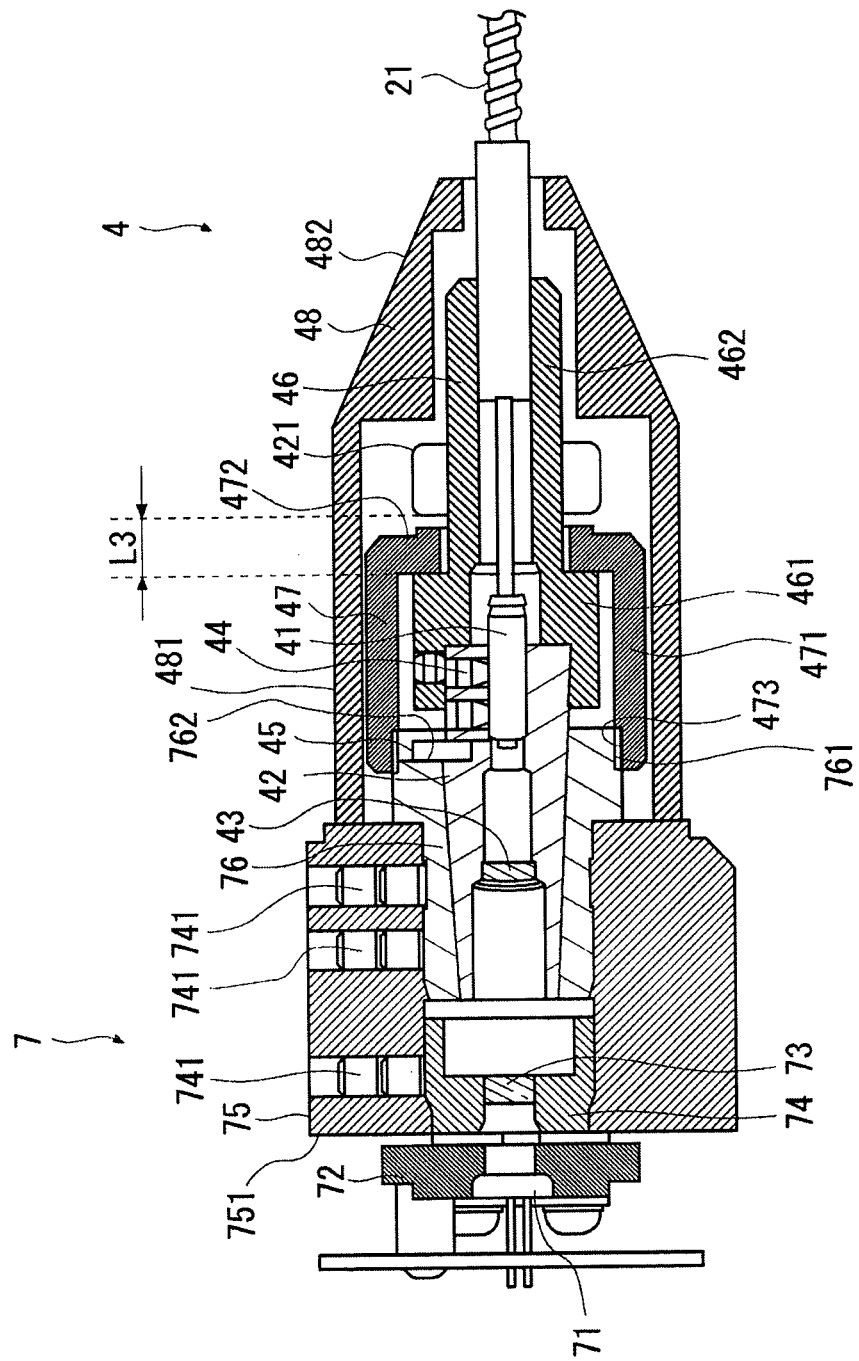
FIG. 7 is a cross-sectional view of a light source connector of the optical encoder according to the first embodiment.
Figure 8:
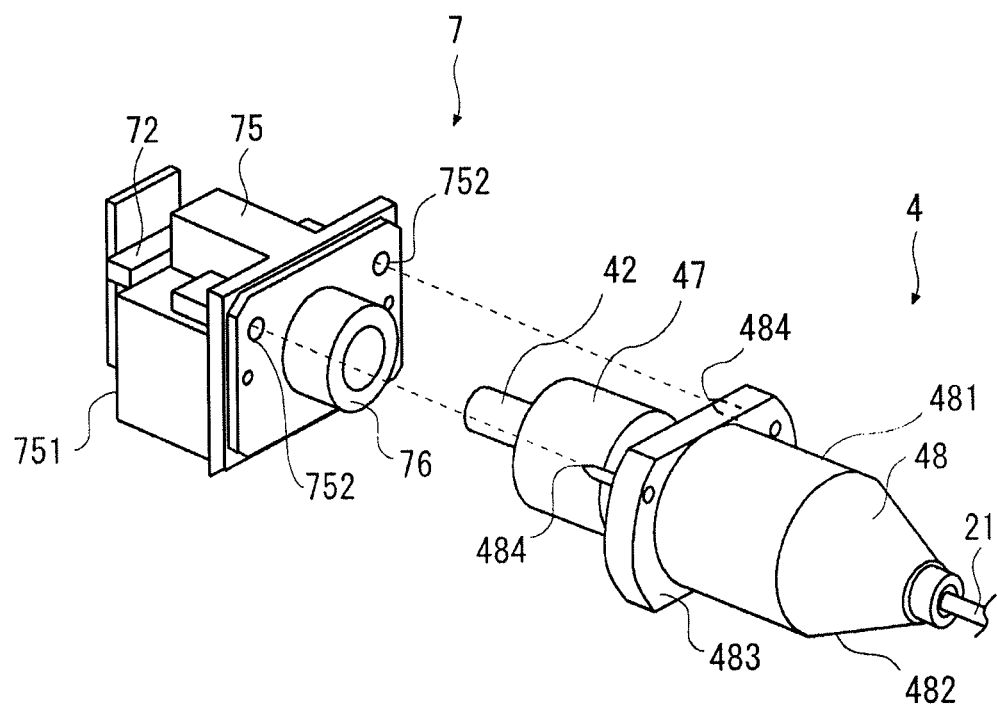
FIG. 8 is a perspective view of a main portion of the optical encoder according to the first embodiment.
Figure 9:
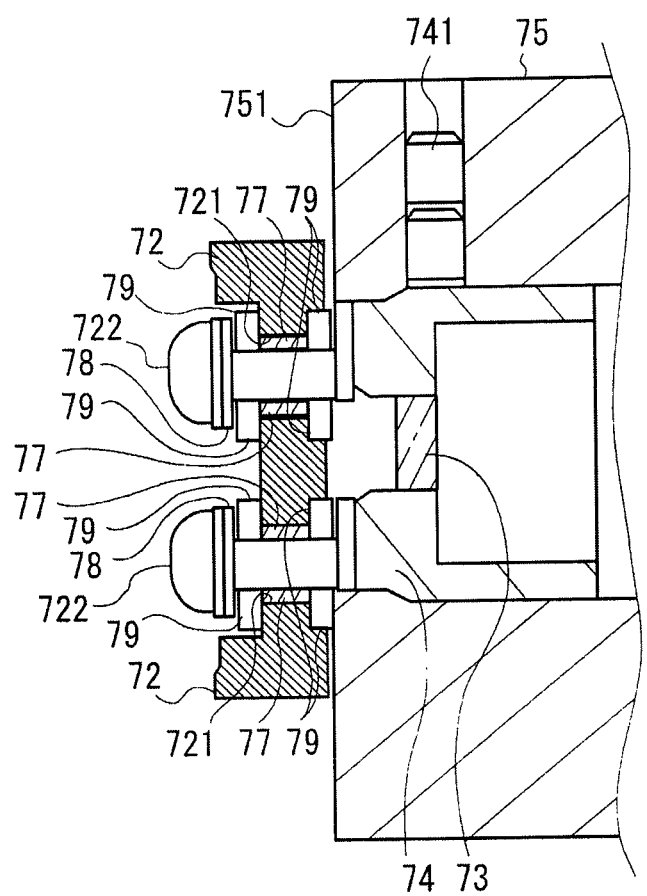
FIG. 9 is a cross-sectional view of a main portion of the light source connector of the optical encoder according to the first embodiment.
Figure 10:
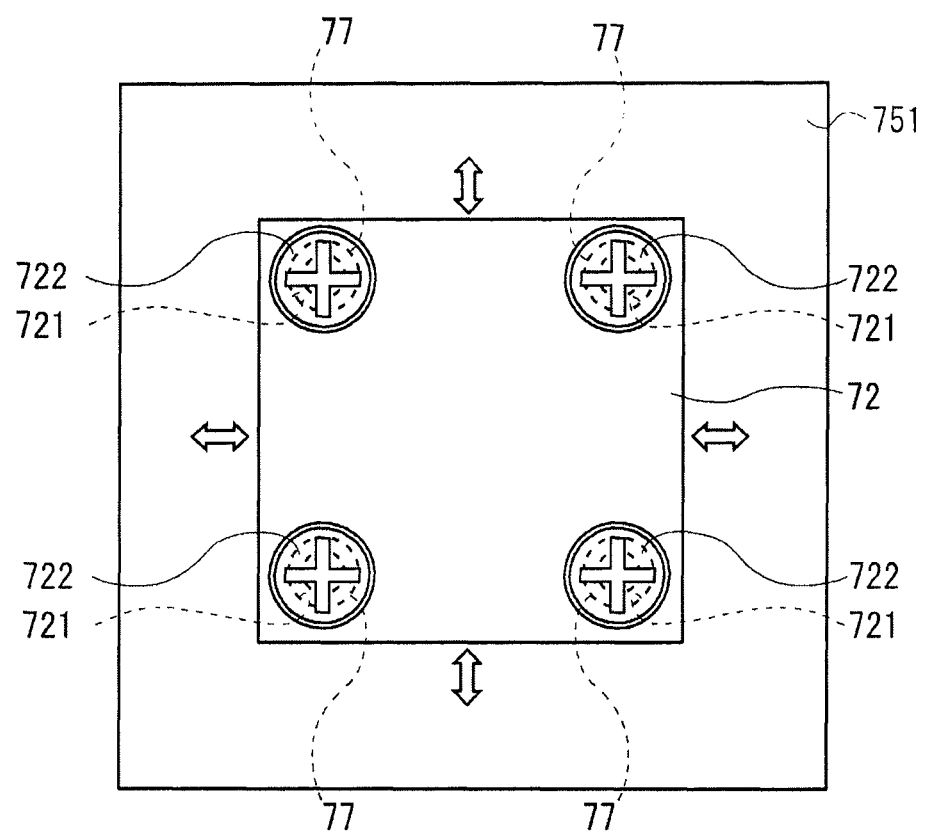
FIG. 10 is a back view of the main portion of the light source connector of the optical encoder according to the first embodiment.
Figure 11:
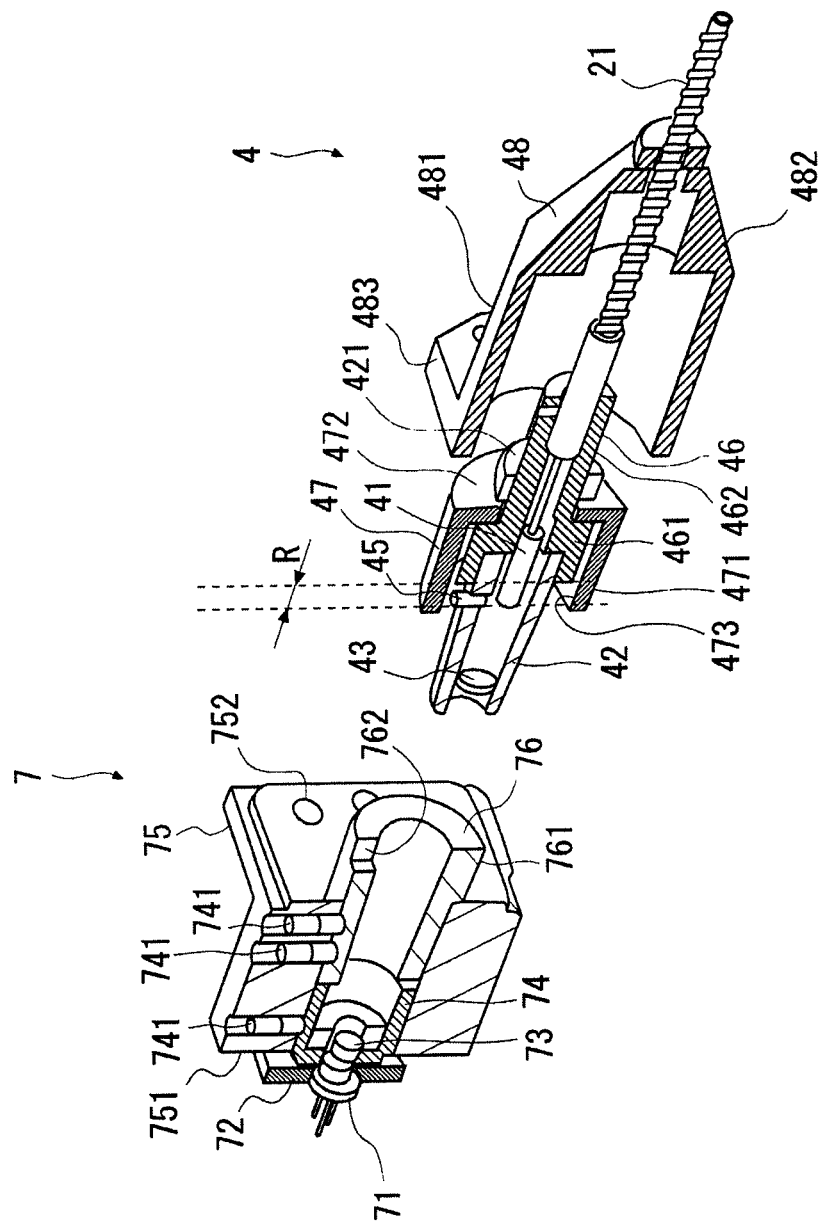
FIG. 11 is a cross-sectional perspective view of a main portion of the optical encoder according to the first embodiment.

An optical encoder according to a first embodiment is described with respect to FIGS. 1 to 11. FIG. 1 is a perspective view of the optical encoder according to the first embodiment. FIG. 2A is a perspective view of a scale unit of the optical encoder according to the first embodiment. FIG. 2B is a cross-sectional view of the scale unit of the optical encoder according to the first embodiment. FIG. 3 is a perspective view of a main portion of the scale unit of the optical encoder according to the first embodiment. FIG. 4 is a perspective view of the main portion of the scale unit of the optical encoder according to the first embodiment. FIG. 5A is a perspective view of a tip of a detection head of the optical encoder according to the first embodiment. FIG. 5B is a front view of a main portion of the detection head of the optical encoder according to the first embodiment. FIG. 6 is a side view of a main portion of the optical encoder according to the first embodiment. FIG. 7 is a cross-sectional view of a light source connector of the optical encoder according to the first embodiment. FIG. 8 is a perspective view of a main portion of the optical encoder according to the first embodiment. FIG. 9 is a cross-sectional view of a main portion of the light source connector of the optical encoder according to the first embodiment. FIG. 10 is a back view of a main portion of the light source connector of the optical encoder according to the first embodiment. FIG. 11 is a cross-sectional perspective view of a main portion of the optical encoder according to the first embodiment.

As shown in FIG. 1, an encoder 100 includes a scale unit 1, a detection head 2, a fiber bundle 3, a light source fiber 21, a photoreceiver fiber 22, a light source connector 4, a photoreceiver connector 5, and an interface 6 (electronic components). The encoder 100 is an optical encoder capable of detecting position information of the detection head 2 relative to a scale 11 (described below), the position information being detected via the fiber bundle 3, the light source fiber 21, the photoreceiver fiber 22, and the interface 6.

As shown in FIGS. 2A and 2B, the scale unit 1 includes a scale 11, a scale holder 12, a glass cover 13, and side panels 14. The scale unit 1 is attached to a predetermined location for which relative position information of the detection head 2 is to be found.

As shown in FIG. 3, the scale 11 is configured with a light-transmissive material such as glass. In addition, the scale 11 is a plate-shaped member extending in a measurement direction X. The scale 11 includes bar-like scale marks 111 arrayed at predetermined intervals in the measurement direction X on a top surface 112 of the scale 11. The scale marks 111 can, for example, be formed by an etching process. When coherent light is emitted from above a principal surface of the scale 11, positive first order and negative first order diffracted light is generated. Interference occurs in the diffracted light, forming an interference pattern. Phase detection can be performed on the interference pattern to obtain the position information for the detection head 2 relative to the scale 11. In order to inhibit zero order reflected light, the scale marks 111 preferably have a thickness (¼ of light source wavelength) sufficient for light reflecting off a top surface thereof and light reflecting off a bottom surface thereof to cancel each other out.

As shown in FIGS. 2B and 4, the scale holder 12 includes scale holding surfaces 121 and 122 for holding the scale 11 and glass cover holding surfaces 123 and 124 for holding the glass cover 13. The scale holder 12 is a plate-shaped member that includes two parallel principal surfaces and a groove on a top principal surface 126, the groove having substantially a quadrilateral shape in cross-section. The scale holding surfaces 121 and 122 are surfaces at a bottom of the groove. Moreover, a groove-like recess capable of holding an adhesive, for example, is provided between the scale holding surfaces 121 and 122. The scale holding surfaces 121 and 122 both have the same height. The glass cover holding surfaces 123 and 124 are formed extending in the measurement direction X on the principal surface 126 of the scale holder 12 in such a way as to have the scale holding surfaces 121 and 122 therebetween. The glass cover holding surfaces 123 and 124 are formed such that both are located at positions higher than those of the scale holding surfaces 121 and 122. The glass cover holding surface 123 is formed so as to be located at a position higher than that of the glass cover holding surface 124.

The scale 11 is adhered using an adhesive, for example, applied to the groove-like recess between the scale holding surfaces 121 and 122 of the scale holder 12. The scale holder 12 is capable of holding the scale 11 such that the top surface 112 of the scale 11 and the principal surface 126 of the scale holder 12 are parallel. In addition, the scale holder 12 is capable of holding the glass cover 13 such that a top surface 131 of the glass cover 13 is inclined with respect to the principal surface 126 of the scale holder 12. In addition, the scale holder 12 includes attachment holes 125 for attaching the scale holder 12 to a predetermined location. The glass cover 13 is a plate-shaped member configured with a scratch-resistant, light-transmissive material, such as glass. The scale 11 is positioned between the glass cover 13 and the scale holder 12. The top surface 131 of the glass cover 13 is inclined at a predetermined angle θ with respect to the top surface 112 of the scale 11. Herein, when the scale holder 12 is attached to a predetermined location along a horizontal surface, for example, the top surface 112 of the scale 11 follows the horizontal surface, while the top surface 131 of the glass cover 13 is inclined at the predetermined angle θ with respect to the horizontal surface.

Referring once more to FIG. 2A, the side panels 14 cover two ends of the glass cover 13 and the scale holder 12, which, together with the glass cover 13 and the scale holder 12, seal off the scale 11. In other words, the glass cover 13, the scale holder 12, and the side panels 14 are each protectors protecting the scale 11.

As shown in FIGS. 5A and 5B, the detection head 2 includes the light source fiber 21, the photoreceiver fiber 22, a ferrule 23, and a transmission amplitude grating mask 25. The detection head 2 is positioned above the scale marks 111 of the scale 11 (see FIG. 1).

The light source fiber 21 is an optical fiber that includes a core 212, through which light travels, and a cladding 213 surrounding the core 212, the cladding 213 being configured with a material having a refractive index lower than that of the core 212. Moreover, the light source fiber 21 may further include a coating covering the cladding 213. The light source fiber 21 extends from the detection head 2, through the fiber bundle 3 (see FIG. 1), to the light source connector 4 (see FIG. 1). The light source fiber 21 is positioned at a center of the detection head 2. Light from the light source can travel through the light source fiber 21 and be emitted at the scale 11. A single mode fiber, for example, can be used as the light source fiber 21.

The photoreceiver fiber 22, similar to the light source fiber 21, is an optical fiber that includes a core 222, through which light travels, and a cladding 223 surrounding the core 222, the cladding 223 being configured with a material having a refractive index lower than that of the core 222. Moreover, the photoreceiver fiber 22 may further include a coating covering the cladding 223. The photoreceiver fiber 22 extends from the detection head 2, through the fiber bundle 3 (see FIG. 1), to the photoreceiver connector 5 (see FIG. 1). Six photoreceiver fibers 22 are positioned so as to surround the light source fiber 21. Light reflected off the scale 11 can travel through the photoreceiver fibers 22 to the photoreceiver connector 5. A multimode fiber, for example, can be used as the photoreceiver fiber 22.

The ferrule 23 is substantially a tubular member capable of accommodating optical fiber therein. The ferrule 23 accommodates the light source fiber 21 and the six photoreceiver fibers 22 therein. The light source fiber 21 and the photoreceiver fibers 22 are positioned near a center axis of the ferrule 23. The ferrule 23 is configured with, for example, metal, resin, or ceramic.

The transmission amplitude grating mask 25 is installed so as to cover forefront ends of the light source fiber 21 and the six photoreceiver fibers 22. The transmission amplitude grating mask 25 is transmissive to light and allows the light to travel to the core 222 of the photoreceiver fiber 22, then to generate a phase difference in an interference pattern signal.

At this point, with additional reference once more to FIG. 2B, the angle θ of the top surface 131 of the glass cover 13 is appropriately determined in response to a position and size of the photoreceiver fibers 22 and the light source fiber 21, in response to a degree of diffusion of light output from the light source fiber 21, and in response to a space allowed in order to ensure necessary functionality of the scale 11. When the angle θ is increased to an extent that space allows, light reflected from the glass cover 13 can be more reliably diverted from the photoreceiver fibers 22. An influence of the light reflected from the glass cover 13 can thus be inhibited and accuracy of a photoreception signal can be maintained. In addition, an influence of multiple interference between the scale 11 and the glass cover 13, for example, can be inhibited. Moreover, simply by setting the angle θ to a predetermined size (e.g., a size sufficient to divert some reflected light away from the photoreceiver fibers 22), the influence of the light reflected off the glass cover 13 can be sufficiently inhibited. Thereby, accuracy of the photoreception signal can be sufficiently maintained.

Furthermore, a more concrete description is given regarding the angle θ. As shown in FIG. 6, when an outer diameter of the light source fiber 21 and each one of the photoreceiver fibers 22 are defined as D and a distance between the detection head 2 and the glass cover 13 is defined as L1, for example, in order to reflect the reflected light such that the photoreceiver fibers 22 are completely diverted from a path of the reflected light, the angle θ must be defined so as to distance the reflected light from a center of the light source fiber 21 by at least 1.5D cos 30°. For example, when the outer diameter D is 0.25 mm and the distance L1 between the detection head 2 and the glass cover 13 is 5 mm, 1.5D cos 30° gives 0.32 mm and the angle θ must be at least 3.7° or more. When conducting an experiment with an outer diameter D of 0.25 mm and a distance L1 of 5 mm, the angle θ was defined to be at least 2.6°. In such a case, scale light was able to be adequately detected. When the angle θ is defined as at least 2.6° (i.e., defined as at least around 70% or more of 3.7°, which is the angle necessary for the photoreceiver fibers 22 to be completely diverted from the path of the reflected light), the influence of the light reflected from the glass cover 13 can be sufficiently inhibited and the influence of multiple interference between the scale 11 and the glass cover 13 is inhibited. Specifically, when the angle θ has a predetermined size such that the reflected light is somewhat, but not completely, diverted from the photoreceiver fibers 22, the influence of the light reflected from the glass cover 13 can be sufficiently inhibited and the influence of multiple interference can be inhibited.

With reference once more to FIG. 1, the fiber bundle 3 gathers together the light source fiber 21 and the photoreceiver fibers 22 and connects them to the detection head 2. The fiber bundle 3 improves handling of the detection head 2.

Next, a description of the light source connector 4 is given. As shown in FIGS. 7, 11, and 13A to 13C, the light source connector 4 includes a ferrule 41, a holder 42, a connector 46, a housing 48, a nut 47, and a detent pin 45. The light source connector 4 is connected to a light source unit 7 of the interface 6 and supplies light from the light source unit 7 to the light source fiber 21.

The ferrule 41 is substantially a tubular member capable of accommodating the light source fiber 21 therein. The ferrule 41 is configured with, for example, metal, resin, or ceramic.

The holder 42 is substantially a cylindrical member holding the ferrule 41 and a collecting lens 43 therein. The collecting lens 43 faces the core 212 of the light source fiber 21 accommodated within the ferrule 41. Herein, when light is emitted onto the collecting lens 43 from a side opposite a surface facing the ferrule 41, the collecting lens 43 can collect the light onto the core 212 of the light source fiber 21. A rotation arrester 44 presses the ferrule 41 against an inner circumferential surface of the holder 42, thus fixating the ferrule 41 so as to not rotate relative to the holder 42. The holder 42 has a shape increasing in cross-sectional area from a tip of the light source connector 4 as the holder 42 approaches the ferrule 41 and is, for example, a substantially cylindrical member having a truncated cone shape. Moreover, the holder 42 fixates the detent pin 45 on an outer circumferential surface thereof, the detent pin 45 being upright in a substantially perpendicular manner.

The connector 46 is substantially a tubular member fitting around an exterior of an end portion of the holder 42 and holding the light source fiber 21 therein. The connector 46 includes a large diameter portion 461 and a small diameter portion 462 having a diameter that is small in comparison to the large diameter portion 461. The connector 46 includes a nut abutment 421 that is upright in a substantially perpendicular manner on an outer circumferential surface of the small diameter portion 462.

The nut 47 is substantially a cylindrical member that includes a nesting portion 471 and a nesting-with-allowance portion 472. The nesting portion 471 contains the large diameter portion 461 and includes female threading 473. The nesting-with-allowance portion 472 is fitted with play around the small diameter portion 462. The nut 47 can be displaced along a length direction of the connector 46 by a distance L3, from the nut abutment 421 to the large diameter portion 461. In addition, the nut 47 is held so as to be rotatable around the connector 46 as an axis. The female threading 473 can be threaded together with a male threading 761 of a connector guide 76, described hereafter.

The housing 48 is a tubular body that includes a first end 481 and a second end 482. The first end 481 opens so as to surround the holder 42, the connector 46, and the nut 47. The second end surrounds the small diameter portion 462. The housing 48 is configured with, for example, a plastic resin. The housing 48 is capable of displacing along the length direction of the light source fiber 21. In addition, as shown in FIG. 8, the first end 481 includes a collar 483. The collar 483 includes a projection 484 projecting along an axis direction of the light source fiber 21.

The holder 42, the connector 46, the nut 47, and the detent pin 45 are configured with a material combining a predetermined rigidity with strength. For example, stainless steel can be used as such a material. In addition, the holder 42, the connector 46, the nut 47, the nut abutment 421, and the detent pin 45 may also be integrally formed. Further, when the same kind of material is used, each structure, and in particular the holder 42, is preferably optically connected to inhibit loss by matching the position of each structure to the light source unit 7 with a high degree of accuracy.

At this point, with reference once more to FIG. 1, the interface 6 (electronic components) includes the light source unit 7 separably connected to the light source connector 4 (see FIG. 7); a photoreceiver (not shown in the drawings); and a signal processor (not shown in the drawings). The photoreceiver is removably connected to the photoreceiver connector 5 and generates a photoreception signal when receiving return light (scale light) from the scale. The signal processor processes the photoreception signal and calculates the position information of the detection head 2. The interface 6 may also include, as necessary, a signal outputter outputting a generated signal to an external device, or a display displaying, for example, the position information of the detection head 2.

With reference once more to FIG. 7, the light source unit 7 includes a light source 71, a light source holder 72, a collimating lens 73, a collimating lens holder 74, a light source base 75, and the connector guide 76.

A laser diode (LD), for example, can be used as the light source 71. The light source 71 is connected to an electronic component board (not shown in the drawings) and emits light when supplied with electric current, then causes coherent light to strike the collimating lens 73 as incident light. Moreover, a He—Ne laser can also be used as the light source 71.

The light source holder 72 is a plate-shaped member holding the light source 71 and displaceably installed on an installation surface 751 of the light source base 75. Specifically, as shown in FIGS. 9 and 10, the light source holder 72 is a plate-shaped member that includes screw holes 721 at four corners thereof. Screws 722 are fastened to the screw holes 721 to install the light source holder 72 on the installation surface 75. The screws 722 have a diameter smaller than that of the screw holes 721 such that the male threading of the screws 722 is separated from an interior wall surface of the screw holes 721. When the screws 722 are loosened, the light source holder 72 can be displaced in a two-dimensional direction along the installation surface 751 of the light source base 75 and the position of the light source 71 can be fine-tuned. Thereby, the position of the light source 71 can be matched to the collimating lens 73. In addition, the light source holder 72 contacts the screw 722 via a collar 77, a metal washer 78, and a ceramic washer 79. The metal washer 78 is installed between the screw 722 and the ceramic washer 79. The metal washer 78 prevents contact between the screw 722 and the ceramic washer 79, smoothly fastening the screw 722 and protecting the ceramic washer 79. In addition, ceramic washers 79 are positioned between the light source holder 72 and the screw 722, as well as between the light source holder 72 and the light source base 75. The ceramic washer 79 is configured with a ceramic and has, in addition to electrical insulation properties, the rigidity necessary when fastening the screws 722 to the light source base 75. In addition, the collar 77 is installed so as to separate the screw hole 721 from the screw 722. The collar 77 is configured with a resin and has electrical insulation properties. Even when the light source holder 72 is displaced in the two-dimensional direction along the installation surface 751, the collar 77 does not directly contact the screw 722 or the light source holder 72, and therefore the screw 722 and the light source holder 72 are electrically insulated.

The collimating lens 73 converts incident light from the light source 71 into parallel light. The collimating lens holder 74 is substantially a tubular member holding the collimating lens 73 therein. The collimating lens holder 74 is pressed against and fixated to an inner circumferential surface of the light source base 75 by a lock screw 741.

The light source base 75 is substantially a tubular member holding the collimating lens holder 74 and the connector guide 76 therein. While holding the collimating lens holder 74 and the connector guide 76, the light source base 75 is attached to a predetermined location inside the interface 6. The light source base 75 includes a detector 753 (not shown in the drawings) for detecting connection/separation of the light source unit 7 and the light source connector 4. The detector 753 is, for example, installed on a bottom portion of a projection retaining hole 752 (see FIG. 8). When the light source connector 4 and the light source unit 7 are connected, the projection 484 reaches a bottom of the projection retaining hole 752. When the projection 484 reaches the bottom of the projection retaining hole 752, the detector 753 is pressed by the projection 484, detecting the connection of the light source connector 4 to the light source unit 7. Moreover, the detector 753 can send a detection signal regarding the connection to an electronic component board (not shown in the drawings). Thereafter, when the light source connector 4 and the light source unit 7 are separated, the separation can be detected by removal of the load from the detector 753. Moreover, the detector 753 can send a detection signal regarding the separation to the electronic component board (not shown in the drawings).

The connector guide 76 has a shape decreasing in cross-sectional area as the connector guide 76 approaches the light source 71, and is, for example, a substantially tubular member having a hollow truncated cone shape. The holder 42 is inserted within the connector guide 76 and fitted together therewith. As shown in FIG. 11, the connector guide 76 includes a groove 762 near an opening on a side fitted together with the holder 42. The groove 762 is long along the axis direction of the connector guide 76. The detent pin 45 is fitted together with the groove 762. The female threading 473 is preferably provided more toward the connector 46 side than the detent pin 45 when the nesting-with-allowance portion 472 is in contact with the large diameter portion 461. In particular, the female threading 473 is preferably provided in a range R spanning from the detent pin 45 to the end of the large diameter portion 461. Accordingly, the male threading 761 and the female threading 473 do not thread together unless the detent pin 45 advances into the groove 762. After the detent pin 45 advances into the groove 762, the male threading 761 and the female threading 473 begin to thread together. The light source connector 4 and the light source unit 7 can be connected without breaking the detent pin 45, the holder 42, and the connector guide 76. The holder 42 is held so as to be incapable of rotating relative to the connector guide 76.

With reference once again to FIG. 1, the photoreceiver connector 5 separably connects the photoreceiver fiber 22 to the photoreceiver (not shown in the drawings). Specifically, the first end of the photoreceiver fiber 22 is connected so as to face a photoreceiver element (not shown in the drawings) included in the photoreceiver. Accordingly, received light strikes the photoreceiver element through the photoreceiver fiber 22. The photoreceiver element generates the photoreception signal and outputs the photoreception signal to the signal processor (not shown in the drawings) of the interface 6. The signal processor calculates the position information of the detection head 2 based on the photoreception signal.

A description is now given of a light path. When the light source 71 is supplied with electric current and emits light, the light strikes the collimating lens 73. The light is made parallel by the collimating lens 73 and strikes the collecting lens 43. The collecting lens 43 collects the parallel light on a light source-side end of the core 212 of the light source fiber 21. Next, the light source fiber 21 transmits the light to a detection head 2-side end of the core 212 and emits (i.e., fires) the light onto the scale unit 1. Most of the emitted light passes through the glass cover 13 and strikes the scale marks 111 of the scale 11. The scale 11 reflects the light toward the photoreceiver fiber 22. Meanwhile, a portion of the light does not pass through the glass cover 13 and reflects off the top surface 112 thereof. Because the top surface 112 is inclined, the reflected light scatters or advances in a direction inclined with respect to the vertical direction. In other words, the light reflected from the top surface 112 can scatter or advance so as to be diverted from the photoreceiver fiber 22, and an amount of light reflected off the glass cover 13 and received by the photoreceiver fiber 22 is reduced. The light reflected off the scale 11 strikes the photoreceiver fiber 22, while the light reflected off the glass cover 13 does not strike the photoreceiver fiber 22. Accordingly, the scale light can be accurately received and detected.

(Connection Method)

Figure 12:
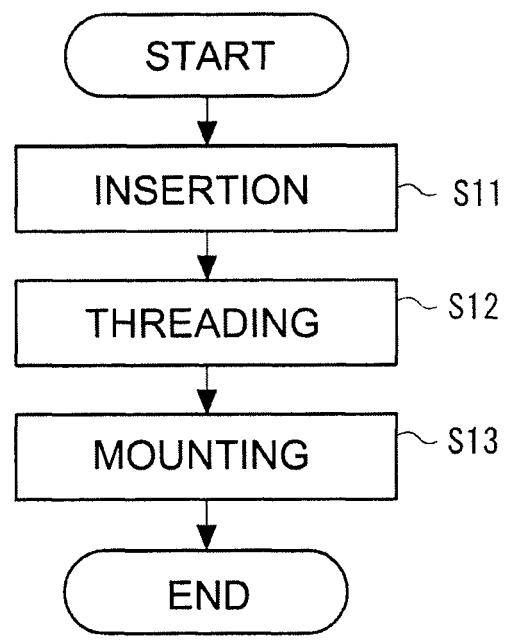
FIG. 12 is a flowchart illustrating a method of connecting the light source connector of the optical encoder according to the first embodiment.
Figure 13A:
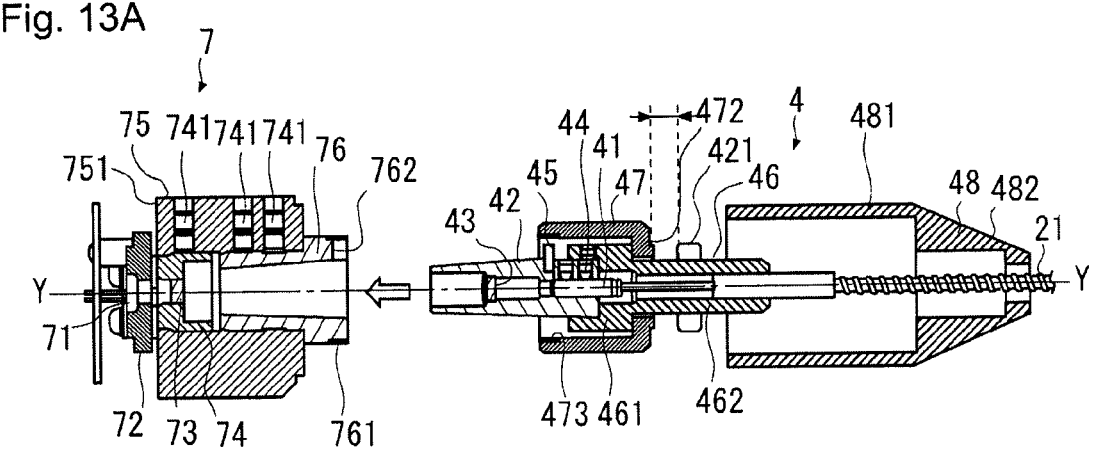
FIGS. 13A to 13C are schematic views illustrating the method of connecting the light source connector of the optical encoder according to the first embodiment.
Figure 13B:
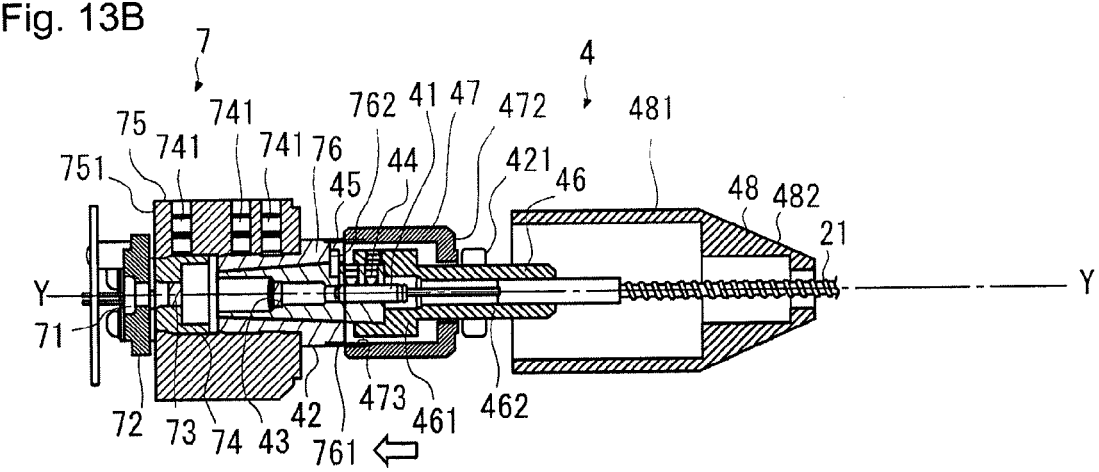

Next, with reference to FIGS. 12 and 13A to 13C, a connection method connecting the light source unit 7 and the light source connector 4 is described. FIG. 12 is a flowchart illustrating a method of connecting the light source connector of the optical encoder according to the first embodiment. FIGS. 13A to 13B are schematic views illustrating the method of connecting the light source connector of the optical encoder according to the first embodiment.

First, as shown in FIG. 13A, the holder 42 of the light source connector 4 is inserted into the connector guide 76 of the light source unit 7 (insertion step S11).

Next, as shown in FIG. 13B, the detent pin 45 of the holder 42 is advanced into the groove 762 of the connector guide 76, the nut 47 is rotated, and the female threading 473 is threaded together with the male threading 761 of the connector guide 76 (threading step S12). At this point, the holder 42 is between the nut 47 and the connector guide 76 and is fixated with respect to the photoreceiver fiber 22 axis direction Y. In addition, the holder 42 advances the detent pin 45 into the groove 762 and is therefore fixated with respect to a rotation direction centered on the axis direction Y. Thereby, an optical connection can be made in which light loss is inhibited.

Figure 13C:
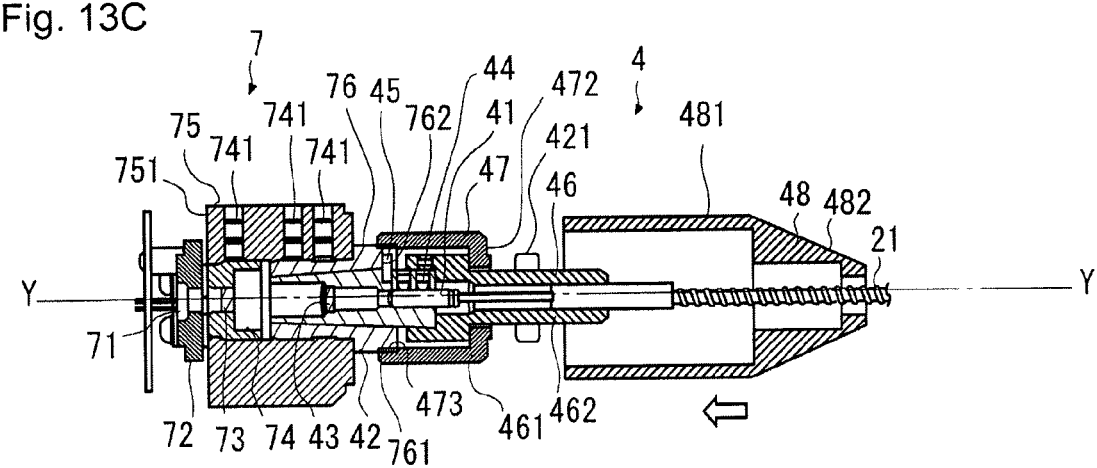

Lastly, as shown in FIG. 13C, the housing 48 is mounted on the light source base 75 (mounting step S13). Specifically, as shown in FIG. 8, the projection 484 of the housing 48 is inserted into the projection retaining hole 752 and the collar 483 contacts the light source base 75. Thereby, as shown in FIG. 7, the connector 46, the holder 42, and the like are contained in the housing 48 and can thus be protected. In addition, the projection 484 presses the detector 753 (not shown in the drawings) installed at the bottom of the projection retaining hole 752 and the detector 753 sends a signal regarding the connection to the electronic component board (not shown in the drawings). Moreover, the electronic component board can output a signal causing the light source 71 to produce light.

Furthermore, after completion of the mounting step S13, a minor adjustment step may also be added in which the light source holder 72 is displaced along a two-dimensional plane coplanar with the installation surface 751 to make minor adjustments to the light source 71. Thereby, minor adjustments can be made to the position of the light source 71 with respect to the collimating lens 73, the collecting lens 43, and the light source fiber 21, the light source 71 can be more accurately connected, and loss due to the optical connection can be inhibited. In addition, by making such minor adjustments, even when various components are swapped out in order to perform maintenance on the encoder 100, the optical connection can be readily made once again simply by completing the insertion step S11 through the mounting step S13.

(Separation Method)

Figure 14:
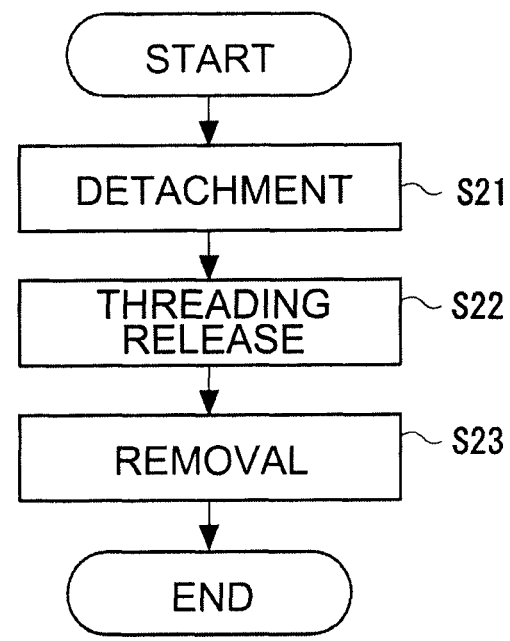
FIG. 14 is a flowchart illustrating a method of separating the light source connector of the optical encoder according to the first embodiment.
Figure 15A:
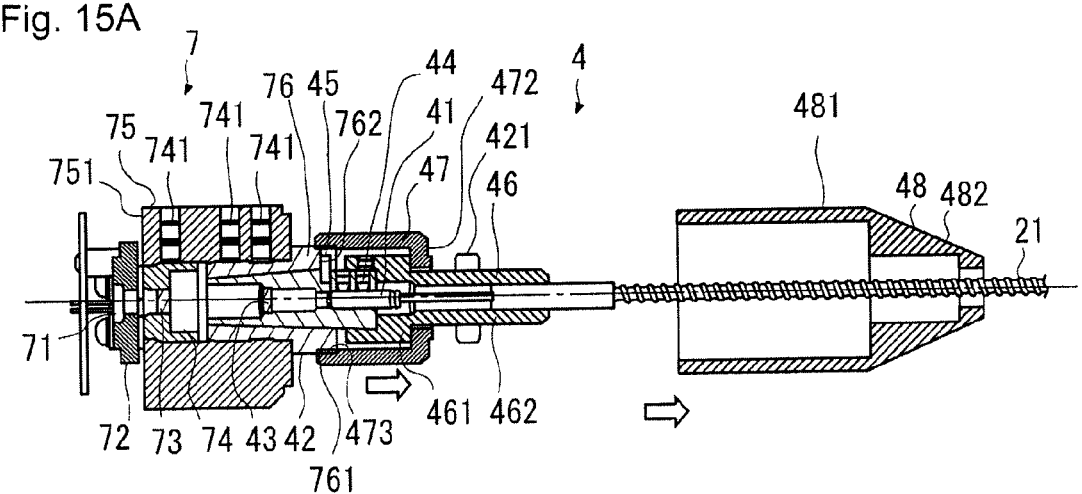
FIGS. 15A to 15C are schematic views illustrating the method of separating the light source connector of the optical encoder according to the first embodiment.
Figure 15B:
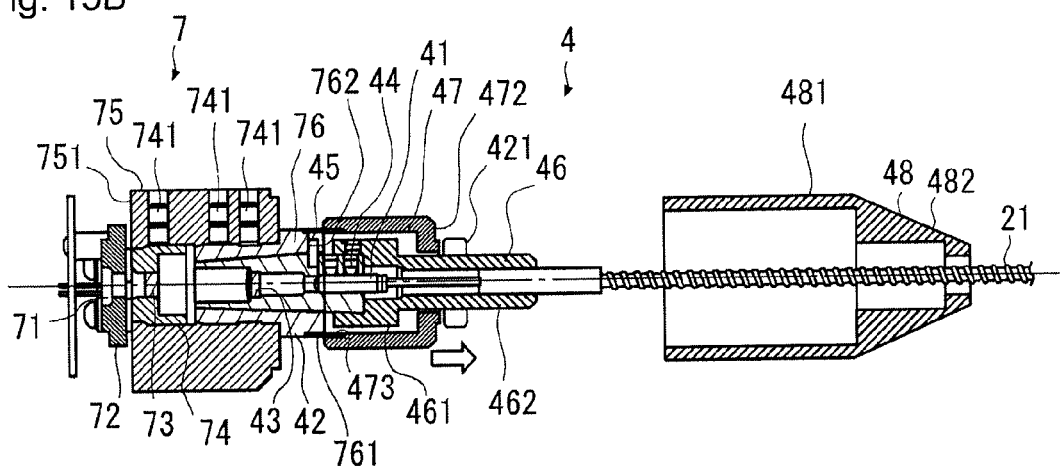
Figure 15C:
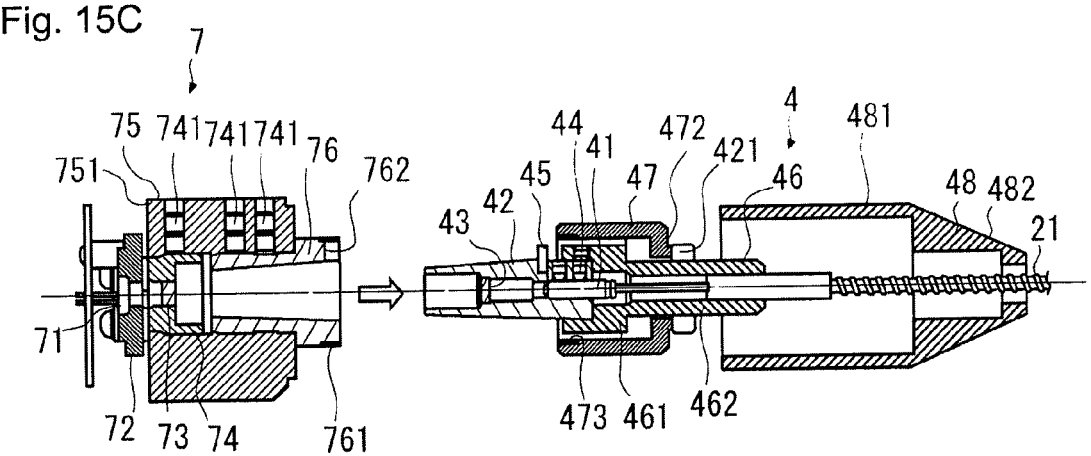

Next, with reference to FIGS. 14 and 15A to 15C, a separation method separating the light source unit 7 and the light source connector 4 is described. FIG. 14 is a flowchart illustrating a method of separating the light source connector of the optical encoder according to the first embodiment. FIGS. 15A to 15C are schematic views illustrating the method of separating the light source connector of the optical encoder according to the first embodiment.

As shown in FIG. 15A, the housing 48 is detached from the light source base 75 (detachment step S21). Specifically, the collar 483 is separated from the light source base 75 and the projection 484 is withdrawn from the projection retaining hole 752. Thereby, the pressure of the projection 484 against the detector 753 (not shown in the drawings) is released and the detector 753 sends a signal regarding the separation to the electronic component board (not shown in the drawings). The electronic component board outputs a signal to the light source 71 to stop producing light. Accordingly, the light source 71 stops producing light and light is no longer emitted from the collimating lens 73 toward the exterior of the light source unit 7.

Next, as shown in FIG. 15B, the nut 47 is rotated and the threading of the nut 47 with the connector guide 76 is released (threading release step S22).

Lastly, as shown in FIG. 15C, the holder 42 is removed from the connector guide 76 (removal step S23). Specifically, when the threading of the nut 47 with the connector guide 76 is released, the nesting-with-allowance portion 472 of the nut 47 strikes the nut abutment 421, and the holder 42 connected to the nut abutment 421 via the connector 46 is withdrawn in a direction separating from the connector guide 76. Thereby, even when the holder 42 is fixated to the connector guide 76, the fixation can be readily freed and the light source connector 4 can be separated from the light source unit 7.

According to the present embodiment, noted above, the holder 42, holding the collimating lens 73 and the light source fiber 21, and the connector guide 76, holding the collecting lens 43, are fitted together at a location where the cross-sectional area successively changes. In addition, the detent pin 45 fits together with the groove 762 and the holder 42 does not rotate relative to the connector guide 76. Accordingly, even when the light source connector 4 and the light source unit 7 are repeatedly attached to and detached from each other, the collecting lens 43 can be matched in a predetermined position with respect to the collimating lens 73 and the light source fiber 21 with a high level of reproducibility. Even when a temperature changes, the position of the collecting lens 43 with respect to the collimating lens 73 and the light source fiber 21 can be maintained so as to keep a change in the position within a predetermined range. Specifically, the optical connection can be made with loss inhibited.

Second Embodiment

Figure 16A:
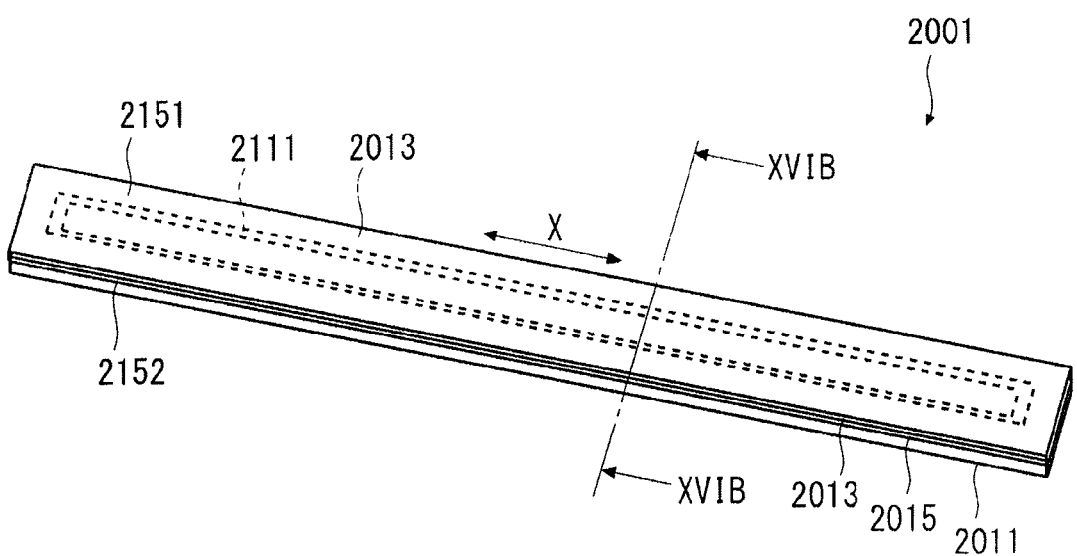
FIG. 16A is a perspective view of a scale unit of an optical encoder according to a second embodiment.
Figure 16B:
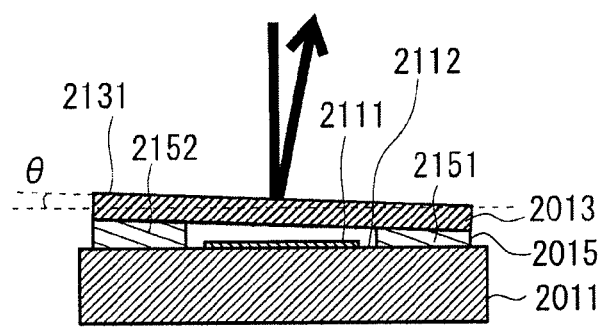
FIG. 16B is a cross-sectional view of the scale unit of the optical encoder according to the second embodiment.

Next, an optical encoder according to a second embodiment is described with reference to FIGS. 16A and 16B. FIG. 16A is a perspective view of a scale unit of the optical encoder according to the second embodiment. FIG. 16B is a cross-sectional view of the scale unit of the optical encoder according to the second embodiment. An encoder 2100 differs from the encoder 100 according to the first embodiment only in the scale unit. Other components are common to both embodiments and thus are given equivalent reference numerals and a description thereof is omitted. In addition, the scale and the glass cover are common to both the scale unit 1 and a scale unit 2001 and thus are given equivalent reference numerals and a description thereof is omitted.

As shown in FIGS. 16A and 16B, the scale unit 2001 includes a spacer 2015 in addition to a scale 2011 and a glass cover 2013. The scale unit 2001 is attached to a predetermined location for which position information relative to a detection head 2002 (not shown in the drawings) is to be found.

The spacer 2015 can be obtained by, for example, molding a plate-shaped member with a resin, forming the spacer 2015 with an etching process for a semiconductor manufacturing process, or the like. The spacer 2015 is installed or formed on a principal surface 2112 of the scale 2011 so as to surround scale marks 2111. The spacer 2015 includes a top end 2151 and a bottom end 2152 formed so as to extend along the measurement direction X and such that the scale marks 2111 are therebetween. The spacer 2015 is formed such that a height of the spacer 2015 from the principal surface 2112 increases from the top end 2151 toward the bottom end 2152. The spacer 2015 supports the glass cover 2013 while inclining the glass cover 2013 at the predetermined angle θ with respect to the principal surface 2112. Herein, when the scale unit 2001 is attached to a predetermined location along a horizontal surface, the principal surface 2112 of the scale 2011 is coplanar with the horizontal surface, while a top surface 2131 of the glass cover 2013 is inclined at the predetermined angle θ with respect to the horizontal surface. In addition, the glass cover 2013 and the spacer 2015 together can seal off the scale marks 2111. In other words, the glass cover 2013 and the spacer 2015 together are protectors protecting the scale marks 2111.

Herein, when light from the light source 2071 is emitted on the scale unit 2001, most of the emitted light passes through the glass cover 2013 and strikes the scale marks 2111 of the scale 2011, similar to the encoder 100 according to the first embodiment. The scale 2011 reflects the light toward a photoreceiver fiber 2022 (not shown in the drawings), the reflected light containing the position information. Meanwhile, a portion of the emitted light does not pass through the glass cover 2013 and reflects off the top surface 2131 thereof. Because the top surface 2131 is inclined, the reflected light scatters or advances in a direction inclined with respect to the vertical direction. In other words, the light reflected from the top surface 2131 can scatter or advance so as to be diverted from the photoreceiver fiber 2022, and an amount of reflected light received by the photoreceiver fiber 2022 is reduced. Therefore, the occurrence of multiple interference between the scale 2011 and the glass cover 2013 can be inhibited and signal accuracy can be maintained.

Accordingly, the scale holder and the side panels are eliminated to economize space, and an influence of light reflected off the glass cover 2013 can be sufficiently inhibited. Thereby, accuracy of the photoreception signal can be maintained and the position information of the detection head 2 can be detected.

Moreover, in the first embodiment, a scale holder was used in which the first glass cover holding surface 123 was higher than the second glass cover holding surface 124. However, a scale holder may also be used having two glass cover holding surfaces of an identical height and an adhesive mixed with glass beads may be applied to one of the glass cover holding surfaces. In addition, a glass cover may be used having an upper principal surface inclined with respect to a lower principal surface. Thereby, a glass cover can be obtained having a top surface inclined with respect to a principal surface of a scale.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. An optical encoder comprising:
a detection head;
a light source connector connected to the detection head via a light source fiber and a photoreceiver fiber, the light source connector comprising a tubular light source fiber holder holding the light source fiber and a collecting lens therein; and
a light source unit removably connected to the light source connector, the light source unit comprising:
a light source;
a light source holder holding the light source; and
a tubular light source base holding the light source holder at a first end and holding a collimating lens therein, the light source base having a threaded portion on a second end and further having a groove with a length along an axis direction on the second end,
wherein the light source connector further comprises a nut rotatable around the light source fiber and displaceable along the light source fiber, the nut comprising a threaded portion threadably connecting with the threaded portion of the light source base while holding at least a portion of the light source fiber holder between the nut and the light source base, wherein the light source fiber holder comprises an end connected to the light source base, and wherein an outer circumferential surface of the end of the light source fiber holder comprises:

an inclined surface inclined such that a cross-sectional area of the light source fiber holder increases in a direction toward the light source fiber; and
a projection configured to protrude into the groove of the light source base.

2. The optical encoder according to claim 1, wherein the light source fiber holder further comprises a nut abutment in a direction from the nut toward the light source fiber.

3. The optical encoder according to claim 1, wherein the light source holder is displaceable with respect to the collimating lens.

4. The optical encoder according to claim 2, wherein the light source holder is displaceable with respect to the collimating lens.

* * * * *